(12) United States Patent
Wolfe, Jr. et al.

(10) Patent No.: US 6,606,967 B1
(45) Date of Patent: Aug. 19, 2003

(54) INTERLOCKING COLLAR ELEMENT APPARATUS AND METHOD

(75) Inventors: Jerry Joe Wolfe, Jr., Hutto, TX (US); Harold Keith Benson, Hutto, TX (US); Robert Troy Dunn, Hutto, TX (US); Jessy B. Gabriel, Hutto, TX (US); James Vincent Haines, Jr., Hutto, TX (US); Brenda Lea Monson, Hutto, TX (US); David John Kroyer, Hutto, TX (US)

(73) Assignee: Triple Crown Dog Academy Inc., Hutto, TX (US)

( * ) Notice: Subject to any disclaimer, the term of this patent is extended or adjusted under 35 U.S.C. 154(b) by 0 days.

(21) Appl. No.: 10/068,609

(22) Filed: Feb. 6, 2002

(51) Int. Cl.[7] .......................... A01K 27/00; A62B 35/00
(52) U.S. Cl. ...................................... 119/856; 119/862
(58) Field of Search ................................ 119/760, 763, 119/856, 862, 863, 864; 16/224, 362; 24/33 R; 2/311

(56) References Cited

U.S. PATENT DOCUMENTS

| | | | |
|---|---|---|---|
| 150,325 A | * 4/1874 | Jaggi | 24/33 R |
| 181,028 A | * 8/1876 | Behel | 24/33 R |
| 441,706 A | 12/1890 | Schneider | 119/864 |
| 448,546 A | * 3/1891 | Sagelsdorff | 119/856 |
| 2,394,144 A | * 2/1946 | Brose | 119/862 |
| 4,935,996 A | * 6/1990 | Ferrara | 24/33 R |
| 5,317,989 A | 6/1994 | Swanson et al. | 119/864 |
| 5,647,303 A | 7/1997 | Deioma | 119/864 |
| 6,101,980 A | 8/2000 | Davies-Ross | 119/856 |
| 6,308,663 B1 | * 10/2001 | Philen et al. | 119/863 |
| 6,438,807 B1 | * 8/2002 | Ptolemy | 119/856 |

* cited by examiner

Primary Examiner—Charles T. Jordan
Assistant Examiner—Elizabeth Shaw
(74) Attorney, Agent, or Firm—J. Nevin Shaffer, Jr.

(57) ABSTRACT

An interlocking collar element (10) apparatus and method includes a collar element (12) with a base section (14), the base section (14) including a first end (16), a second end (18) and a mid section (20). An attachment end (22) is connected to the first end (16), the attachment end (22) including a transverse locking arm (24). A receiving end (26) is connected to the second end (18) of the base section (14), the receiving end including a transverse locking bar (24). A projection (32) is attached to the mid section (20). In other aspects of the invention, a plurality of interlocking collar elements (12) are connected together to form a collar.

20 Claims, 4 Drawing Sheets

INTERLOCKING COLLAR ELEMENT APPARATUS AND METHOD

FIELD OF THE INVENTION

This invention relates to an interlocking collar element apparatus and method. In particular, the invention relates to a plurality of interlocking collar elements conformed to be removably attached one to the other so as to form a collar and formed with a projection on the inside of the collar or, in an alternative, without a projection.

BACKGROUND OF THE INVENTION

Collars serve many useful purposes. By way of example, but not by limitation, collars have proved useful in animal control, training, and behavior modification. The prior art discloses many varieties of "training" collars. Typical of the prior art is the Swanson et al. patent (U.S. Pat. No. 5,317,989) which discloses a simple collar including a first flat strap member and a second control loop. Other "training" type collars include projections of one sort or another designed to provide pressure to the animal so as to assist in controlling and training the animal. The Schneider patent (U.S. Pat. No. 441,706) discloses the use of spring loaded "clutch-fingers". The Deioma patent (U.S. Pat. No. 5,647,303) discloses a constrictive collar made up of multiple flexible members with each flexible member including "fingers" for assisting in animal control.

There are other variations of control collars known in the art. The Davies-Ross patent (U.S. Pat. No. 6,101,980) discloses a collar with a series of prongs or posts arranged to contact the throat of the animal that are embedded in a compressible, resilient material so that when the leash is not pulling, the prongs are recessed within the compressible, resilient material.

A problem with the prior art collars is that there is no middle ground. That is, with the prior art collars, the collar will either have the spring loaded prongs or not, for example. Collars with prongs are useful, but do not allow for covering the entire range of animal control from highly aversive collars with prongs to non-aversive collars with very few prongs. Additionally, prior art collars are not easily adjustable nor do they provide for an attractive exterior surface capable of decoration.

Thus, there is a need in the art for providing an apparatus and method for an interlocking collar element that is easily removably attachable one to the other so as to provide a collar with projections for enhanced animal control and/or with a few projections so as to provide a less aversive collar as training progresses.

SUMMARY OF THE INVENTION

Accordingly, the interlocking collar element apparatus and method of the present invention includes, in a preferred embodiment, a collar element with a base section including a first end, a second end and a mid-section. An attachment end is connected to the first end of the base section, the attachment end including a transverse locking arm. A receiving end is connected to the second end of the base section, the receiving end including a transverse locking bar. A projection is attached to the mid section.

In another aspect of the invention, a plurality of the interlocking collar elements disclosed above are connected to form a collar. In a further aspect of the invention, a first end piece is connected to the attachment end, the first end piece including an opening. A second end piece is connected to the receiving end, the second end piece including an opening as well.

In a further aspect of the invention, the transverse locking arm comprises a pair of transverse locking arms and the transverse locking bar comprises a pair of transverse locking bars. In another aspect of the invention, the base section includes a planar outer surface and an inner surface with a V-shaped projection. In other aspects of the invention, the planar outer surface includes decorations and, in another aspect, some interlocking collar elements include projections and some interlocking collar elements are without projections.

In another preferred embodiment of the invention, an animal training collar includes a plurality of removably attachable interlocking collar elements connected together to form the collar, the collar elements including a base section, an attachment end and a receiving end. The attachment end includes a transverse locking arm and the receiving end includes a transverse locking bar. Further, the base section includes a planar outer surface and a projection connected to an inner surface.

In another aspect of this embodiment, a first end piece is connected to the attachment end, the first end piece including an opening for receiving a leash. A second end piece is connected to the receiving end, the second end piece including an opening for receiving a leash as well.

In another aspect of the invention, the transverse locking arm comprises a pair of transverse locking arms and, in another aspect, the transverse locking bar comprises a pair of transverse locking bars. In a further aspect, the base section includes a planar outer surface and an inner surface with a V-shaped projection. In one aspect of the invention, the planar outer surface includes decorations. In another aspect of the invention, a combination of interlocking collar elements is provided, some with projections and some without projections.

In another preferred embodiment of the invention, an animal training collar method is provided including the steps of providing a plurality of removably attachable interlocking collar elements, the collar elements including a base section, an attachment end and a receiving end. Next, a transverse locking arm is provided in the attachment end and then a transverse locking bar is provided in the receiving end. Next, a planar outer surface is provided with an inner surface on the base section. The inner surface includes an attached projection. Finally, the collar elements are connected together by joining the attachment end of one collar element to the receiving end of another collar element sequentially so as to form a collar.

In another aspect of the invention, a first end piece is connected to the attachment end, the first end piece including an opening for receiving a leash. Next, a second end piece is connected to the receiving end, the second end piece including an opening for receiving the leash as well. In further aspects of the invention, the step of providing a transverse locking arm further includes the step of providing a pair of transverse locking arms and the step of providing a transverse locking bar further includes the step of providing a pair of transverse locking bars. In a final aspect of the invention, the step is added of providing some interlocking collar elements with projections and some interlocking collar elements without the projections.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
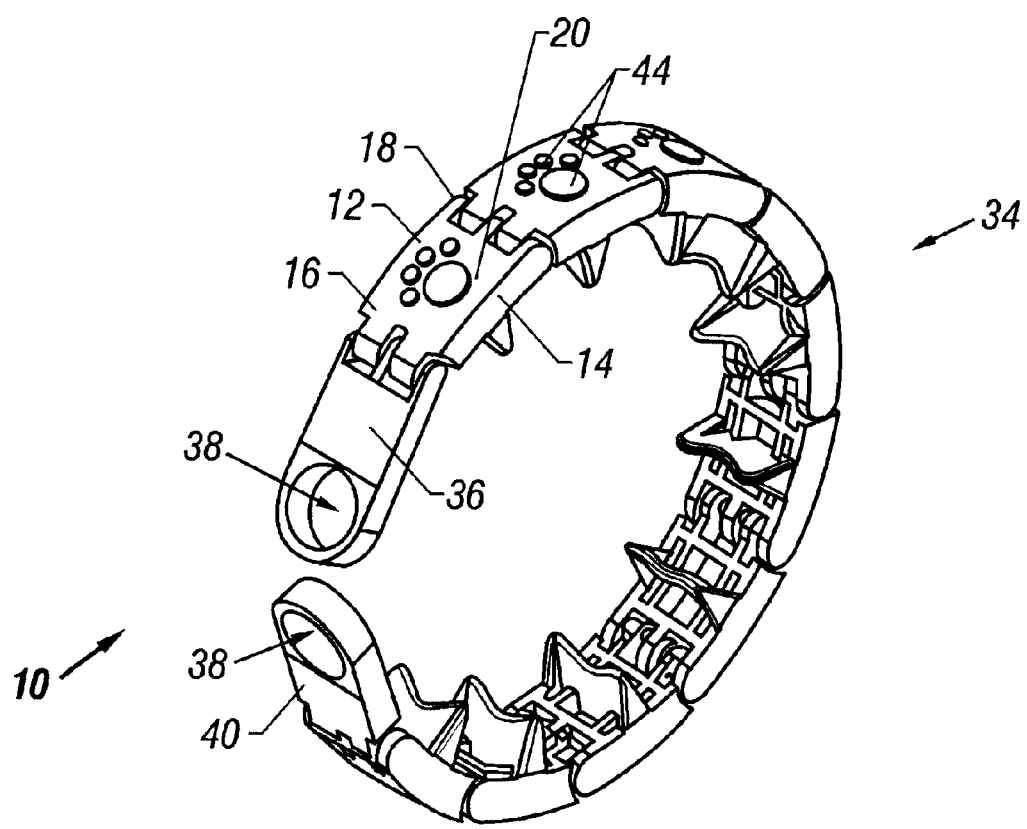
FIG. 1 is a perspective view of the interlocking collar element apparatus of the present invention.

The preferred embodiment of the present invention is illustrated by way of example in FIGS. 1–7. With specific reference to FIGS. 1 and 2, the interlocking collar element apparatus 10 of the present invention includes a collar element 12 with a base section 14. Base section 14 includes a first end 16, a second end 18 and a mid section 20. An attachment end 22 is connected to first end 16 and includes transverse locking arm 24. Further, receiving end 26 is connected to second end 18 and includes transverse locking bar 28. The inner surface 30 of collar element 12 includes projection 32 connected to mid section 20 of base section 14.

As clearly illustrated in FIG. 1, in a preferred embodiment, a plurality of interlocking collar elements 12 are connected together to form a collar 34. In another aspect of the invention, a first end piece 36 is connected to the attachment end 22 of the last available collar element 12 as illustrated in FIG. 1. First end piece 36 includes an opening 38 for receiving a leash or the like as more fully described hereafter. Second end piece 40 is connected to the receiving end of the last available collar element 12 as illustrated in FIG. 1. Second end piece 40 also includes opening 38.

Figure 3:
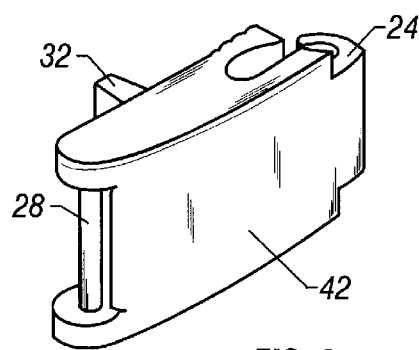
FIG. 3 is a perspective view of the outside of a single interlocking collar element of the present invention.

Referring now to FIG. 3, in a preferred embodiment, collar element 12 includes a planar outer surface 42. Planar outer surface 42 provides several advantages over prior art collars. The first advantage is in providing a non-threatening appearance. When fully connected, interlocking element apparatus 10 creates a collar 34 with a smooth uninterrupted outer surface with much the same appearance as a wrist watch band. An additional advantage created by planar outer surface 42 is that it creates a smooth surface capable of receiving decorations 44 as shown in FIG. 1.

Figure 2:
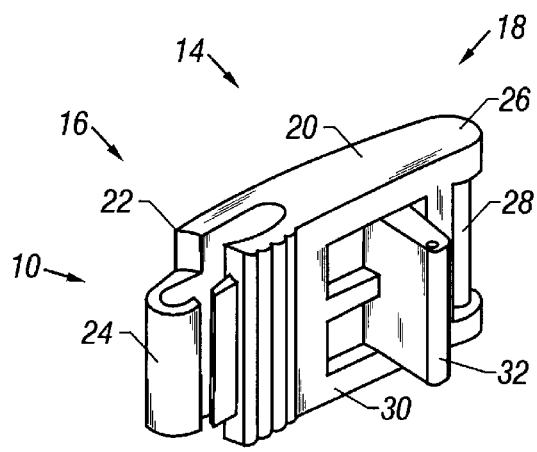
FIG. 2 is a perspective view of the inside of a single interlocking collar element of the present invention.

Referring to FIGS. 2 and 3, it can be seen that transverse locking bar 28 is designed to be inserted within, and be received and movably retained by, transverse locking arm 24. By way of example and not by limitation, collar element 12 of the present invention may be made of plastic or other flexible material such that the material is capable of expanding and contracting slightly so that transverse locking bar 28 may be force fit into transverse locking arm 24 and resiliently held there. When necessary, the resilient nature of the material allows the expansion of transverse locking arm 24 so as to allow the removal of transverse locking bar 28. Certainly any appropriate material now known are hereafter developed is suitable for the purposes of the invention.

Figure 4A:
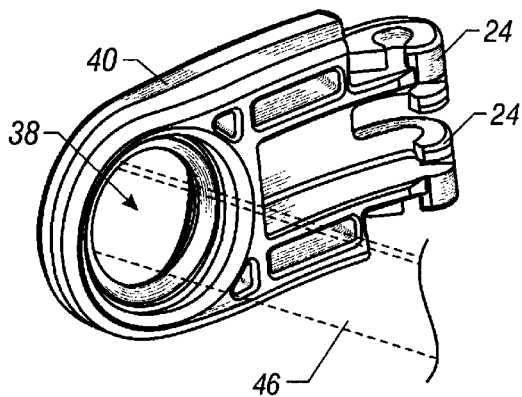
FIGS. 4a and 4b illustrate the first and second end pieces of the present invention with a shadow leash shown passing through the openings.
Figure 4B:
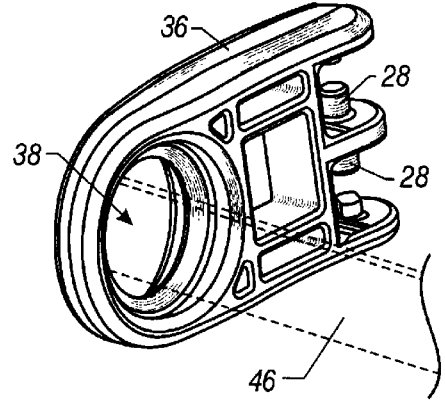

Referring now to FIGS. 4a and 4b, the close-up view of first end piece 36 and second end piece 40 is provided. Once again, first end piece 36 is conformed for connection to attachment end 22 of a collar element 12. As a result, as illustrated, first end piece 36 includes transverse locking bar 28 as well as opening 38. Second end piece 40 is conformed for connection to receiving end 26 of a collar element 12. Thus, second end piece 40 includes a first locking arm 24, as well as an opening 38. The purpose and function of opening 38 is illustrated by way of the shadow connector 46 shown passing through opening 38 in both first end piece 36 and second end piece 40.

Figure 5:
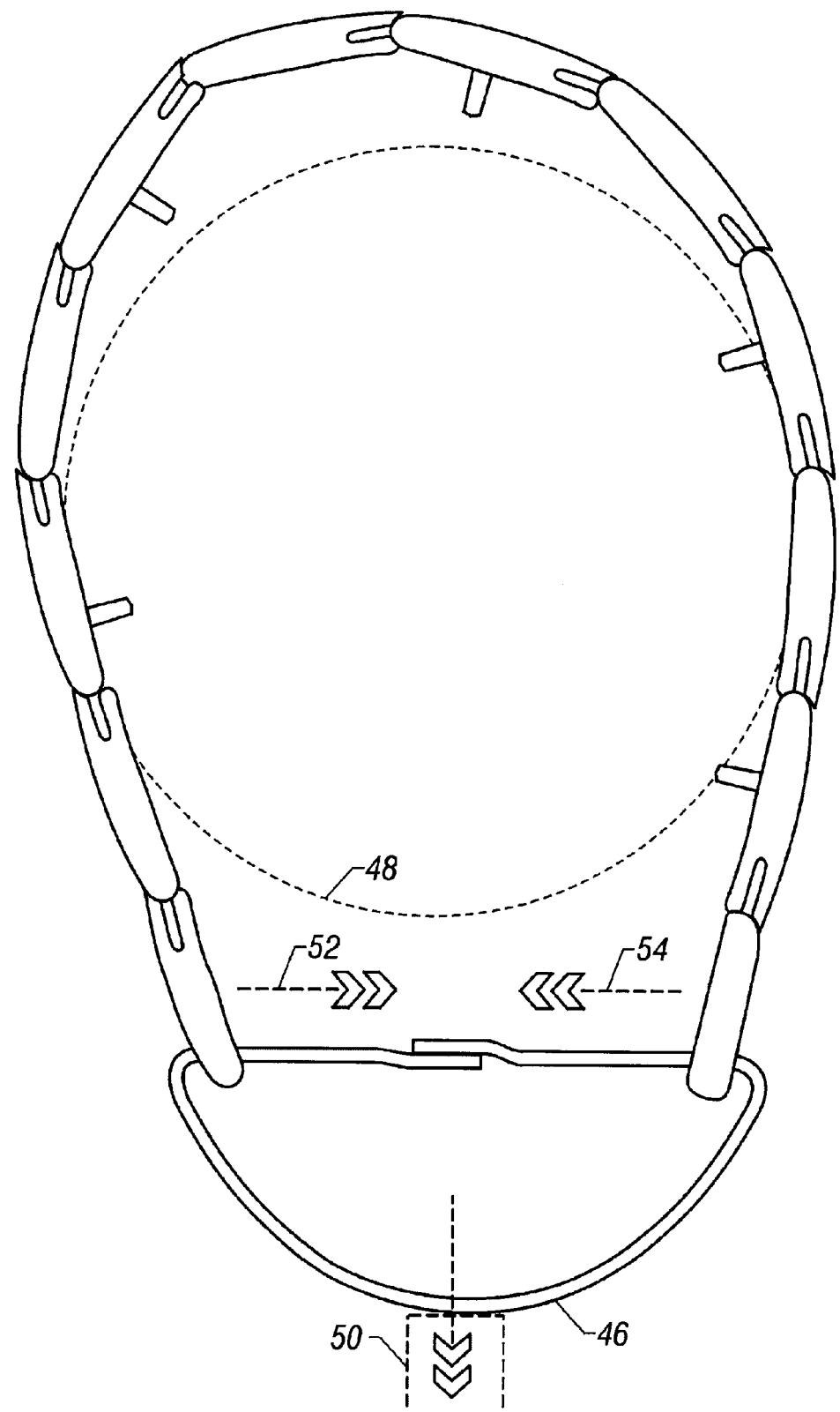
FIG. 5 is a schematic illustrating the functioning of the interlocking collar element apparatus of the present invention when utilized with a leash as a training collar.

Referring now to FIG. 5, the normal use and function of interlocking collar element apparatus 10 as an animal training collar is illustrated. As shown, a plurality of collar elements 12 have been connected together as previously described. In this illustration, collar elements 12 do not all include projection 32. The dashed circle 48 represents the neck of the animal being trained. In operation, when a leash (not shown) is attached to connector 46 and pulled in the direction of arrow 50, first end piece 36 and second end piece 40 are drawn together in the direction of arrows 52 and 54. This results in the application of pressure to the neck of the animal being trained by the inner surface 30 of collar elements 12 without projections and by projections 32 where present. This represents a unique advantage of the interlocking collar element apparatus 10 of the present invention. The present invention allows a trainer to create a collar 34 directly related to the level of training/behavior modification necessary for the animal. That is to say, an animal initially may need a very strongly aversive collar 34 with projections on each and every collar element 12. These projections 32 may be extended, V-shaped projections as illustrated in FIG. 1 or less aggressive, blunt projections 32 has shown in FIGS. 2 and 3 or T-shaped projections shown in FIG. 6. As the training progresses, by means of the present invention, the user is enabled to coordinate the amount of aversive pressure needed. As a result, again, as illustrated in FIG. 5, as training progresses fewer and fewer projections 32 may need to be utilized. Again, because interlocking collar element apparatus 10 is easily assembled and disassembled, the user can create a collar that perfectly matches the needs of the animal being trained as far as the number of collar elements 12 with projections 32 is concerned, as well as the type and aggressiveness of the projection 32 itself. As illustrated, projection 32 is a rectangular form connected across the inner surface 30 of collar elements 12 to form a projection edge across the inner surface 30.

Figure 6:
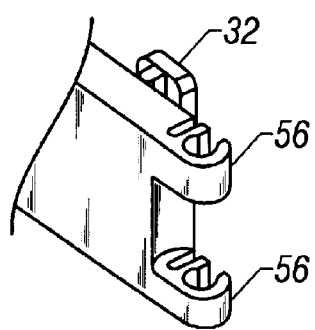
FIG. 6 is a perspective view of another embodiment of the attachment end.
Figure 7:
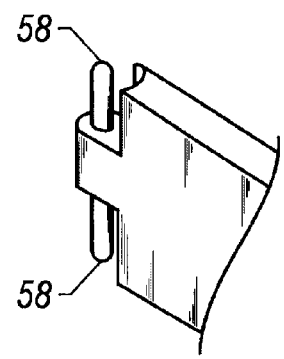
FIG. 7 is a perspective view of another embodiment of the receiving end.

Referring now to FIGS. 6 and 7, another embodiment of the present invention is illustrated. In this embodiment, transverse locking arm 24 includes a pair of transverse locking arms/pins 56. In this embodiment, as illustrated in FIG. 7 transverse locking bar 28 includes a pair of transverse locking bars 58. FIG. 6 also illustrates another form of projection 32. In this embodiment, projection 32 is T-shaped with a projected flat surface. This type of projection 32 would be used, for example, when the animal being trained was almost completely trained and only a slight amount of pressure was needed to accomplish training/behavior modification goals. Obviously, any form of projection 32 in any useful or desired shape is within the scope of this invention.

In operation, a user assembles a plurality of removably attachable interlocking collar elements 12. The individual collar elements 12 are assembled by connecting attachment end 22 of one collar element 12 with the receiving end 26 of another collar element 12. This process is repeated until a collar 34 of sufficient dimension to accomplish the purpose of the collar 34 is attained. As the collar 34 is assembled, the user calculates the amount of aversive feedback appropriate to the animal being trained. In light of this calculation, the user assembles the collar 34 with as many collar elements 12 with projections 32 as necessary to accomplish the training objectives. It should be understood that the collar 34 may result in a completely closed collar 34 and a leash simply slid underneath the collar 34. In a preferred embodiment, however, first end piece 36 and second end piece 40 are attached as previously described and a connector 46 (to which a leash is attached) is passed through openings 38 so that the collar 34 may be utilized as illustrated in FIG. 5 and discussed above.

The description of the present embodiments of the invention have been presented for purposes of illustration but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there may be other embodiments which fall within the spirit and scope of the invention as defined by the following claims.

What is claimed is:

1. An interlocking collar element comprising:
   (a) a collar element with a base section, said base section including a first end, a second end and a mid section;
   (b) an attachment end connected to said first end of said base section, said attachment end including a transverse locking arm;
   (c) a receiving end connected to said second end of said base section, said receiving end including a transverse locking bar; and
   (d) a rectangular projection attached across said mid section forming a projection edge across said mid section.

2. The apparatus of claim 1 further comprising a plurality of said interlocking collar elements connected together to form a collar.

3. The apparatus of claim 2 further comprising:
   (a) a first end piece connected to said attachment end, said first end piece including an opening; and
   (b) a second end piece connected to said receiving end, said second end piece including an opening.

4. The apparatus of claim 2 further comprising a combination of interlocking collar elements, some with said projections and some without said projections.

5. The apparatus of claim 1 wherein said transverse locking arm comprises a pair of transverse locking arms.

6. The apparatus of claim 1 wherein said transverse locking bar comprises a pair of transverse locking bars.

7. The apparatus of claim 1 wherein said base section further comprises:
   (a) a planar outer surface; and
   (b) an inner surface with a V-shaped projection.

8. The apparatus of claim 1 further comprising a T-shaped projection.

9. An animal training collar comprising:
   (a) a plurality of removably attachable interlocking collar elements connected together to form said collar, said collar elements including a base section, an attachment end and a receiving end;
   (b) said attachment end including a transverse locking arm;
   (c) said receiving end including a transverse locking bar; and
   (d) said base section including a planar outer surface and a rectangular projection connected across an inner surface of at least one of said base sections forming a projection edge across said inner surface.

10. The apparatus of claim 9 further comprising:
    (a) a first end piece connected to said attachment end, said first end piece including an opening for receiving a connector;
    (b) a second end piece connected to said receiving end, said second end piece including an opening for receiving a connector.

11. The apparatus of claim 9 wherein said transverse locking arm comprises a pair of transverse locking arms.

12. The apparatus of claim 9 wherein said transverse locking bar comprises a pair of transverse locking bars.

13. The apparatus of claim 9 wherein said base section further comprises:
    (a) a planar outer surface; and
    (b) an inner surface with a V-shaped projection.

14. The apparatus of claim 9 further comprising a combination of interlocking collar elements, some with said projections and some without said projections.

15. The apparatus of claim 9 further comprising a T-shaped projection.

16. An animal training collar method comprising the steps of:
    (a) providing a plurality of removably attachable interlocking collar elements, said collar elements including a base section, an attachment end and a receiving end;
    (b) providing a transverse locking arm in said attachment end;
    (c) providing a transverse locking bar in said receiving end;
    (d) providing a planar outer surface and an inner surface on said base section and attaching a rectangular projection across at least one inner surface of said base sections so as to form a projection edge across said inner surface; and
    (e) connecting said collar elements together by joining the attachment end of one collar element with the receiving end of another collar element repeatedly so as to form a collar.

17. The method of claim 16 further comprising the steps of;
    (a) connecting a first end piece to said attachment end, said first end piece including an opening for receiving a connector; and
    (b) connecting a second end piece to said receiving end, said second end piece including an opening for receiving a connector.

18. The method of claim 16 wherein the step of providing a transverse locking arm further comprises the step of providing a pair of transverse locking arms.

19. The method of claim 16 wherein the step of providing a transverse locking bar further comprises the step of providing a pair of transverse locking bars.

20. The method of claim 16 further comprising the step of providing some interlocking collar elements with said projections and some interlocking collar elements without said projections.

* * * * *